Jan. 18, 1927.  
J. W. GEYER  
1,614,952  
CHRISTMAS TREE HOLDER  
Filed March 30, 1923   2 Sheets-Sheet 1

INVENTOR  
John W. Geyer  
BY  
C. M. Clarke  
ATTORNEY

Jan. 18, 1927.

J. W. GEYER 1,614,952

CHRISTMAS TREE HOLDER

Filed March 30, 1923    2 Sheets-Sheet 2

INVENTOR
John W. Geyer
BY
C. M. Clarke
ATTORNEY

Patented Jan. 18, 1927.

1,614,952

UNITED STATES PATENT OFFICE.

JOHN W. GEYER, OF PITTSBURGH, PENNSYLVANIA.

CHRISTMAS-TREE HOLDER.

Application filed March 30, 1923. Serial No. 628,762.

This invention is for an improvement in Christmas tree holders, and relates particularly to that type of holder in which the tree may be revolved.

The primary object of the present invention is to provide a Christmas tree holder of an attractive design, which may be rotated by mechanism which may have a musical device associated therewith, and which enables the revolving tree to have electric lights thereon without the use of wires, and a swivel carried above the tree.

The invention may be understood by reference to the accompanying drawings, in which.

Figure 1:
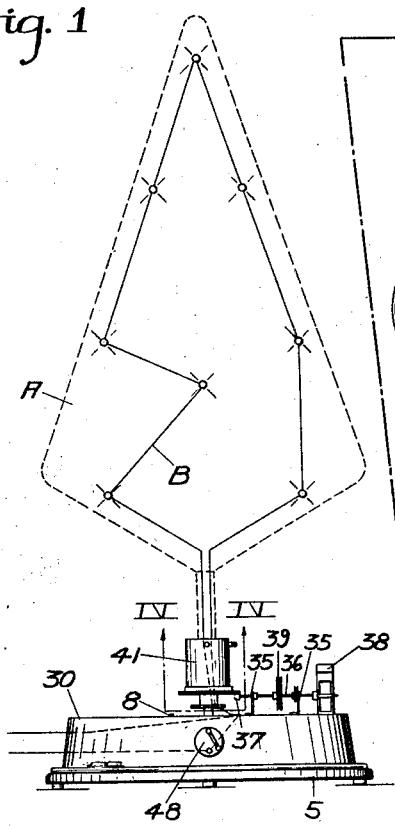
Fig. 1 represents a side elevation of a tree holder embodying my invention, showing a Christmas tree outlined by dotted lines in position thereon, and showing the electric lights.
Figure 2:
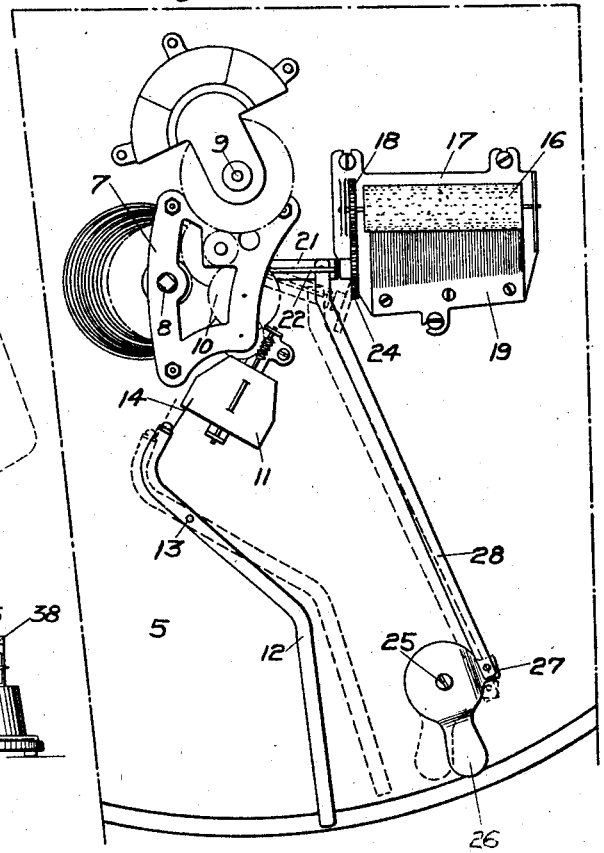
Fig. 2 is a plan view of the mechanism for driving the tree and playing music.
Figure 4:
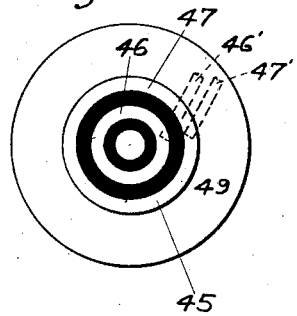
Fig. 4 is a bottom view of a commutator for conducting current to the rotating tree lights.
Figure 3:
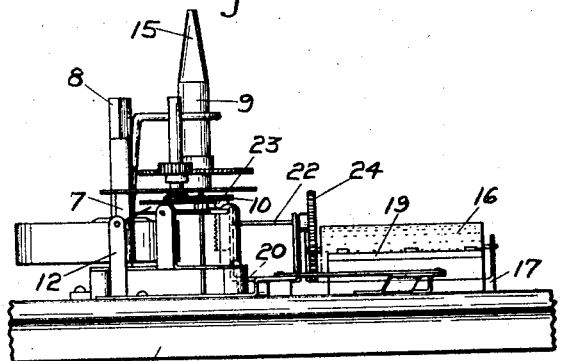
Fig. 3 is a side view of the mechanism shown in Fig. 2.
Figure 5:
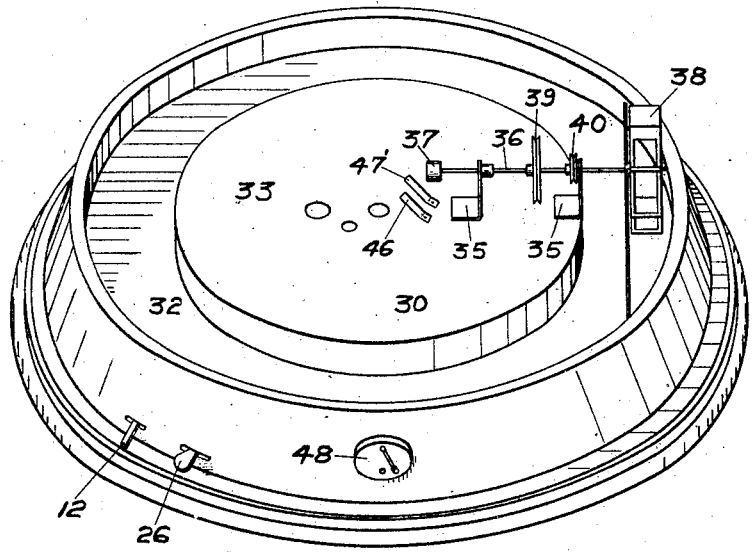
Fig. 5 is a perspective view of the device with the tree receiving receptacle removed.
Figure 6:
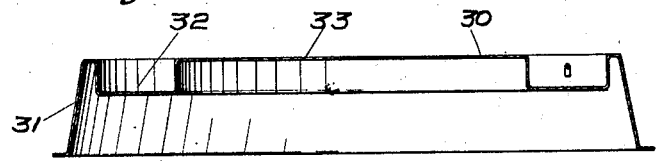
Fig. 6 is a cross section through the cover.
Figure 7:
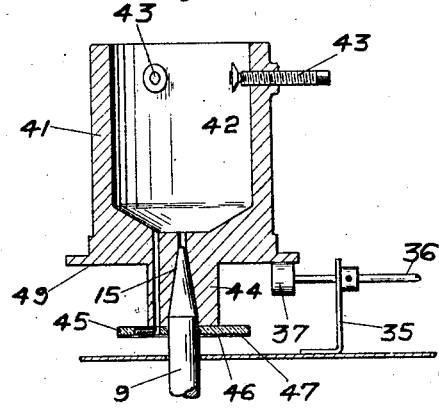
Fig. 7 is a vertical section through the tree receiving receptacle.

In the drawings, 5 represents a base which preferably is made of wood, and is preferably circular in form. Secured to the base is a spring motor 7 which is wound by key shaft 8, and which drives a centrally positioned shaft 9 through a clock train 10. At 11 is a fan governor. Lever 12, pivoted at 13, has a wire 14 on its inner end which may be brought into engagement with the fan governor by operation of the lever to provide a brake for the motor. The upper end of shaft 9 is tapered at 15 for the reason hereinafter pointed out.

Also secured to the base 5 is a music box device comprising a studded cylinder 16 on a supporting member 17 and having a gear 18 at its inner end. At 19 is a key bar having teeth for engagement with the studs on the cylinder, the music box being of a common type.

Pivotally supported at 20 is a U-shaped frame 21 having a shaft 22 thereon. The inner end of this shaft carries a gear wheel 23 which is always in engagement with a gear in the clock train. The other end of the shaft carries a gear 24 for engagement with pinion 18 of the cylinder.

Pivoted to the base at 25 is a music control lever having an operating handle 26 and an arm 27 to which link 28 pivotally connects. Link 28 is connected at its other end with the pivoted U-frame 21. By operation of handle 26, the U-frame may be swung about its pivot to bring gear 24 into and out of engagement with pinion 18, whereby the music box will or will not be operated.

Fitting over the base is a housing member 30 which is preferably formed of a single piece of metal. It has an annular supporting side 31 flanged to set on base 5, an annular channel 32 in the outer top thereof, and an upwardly extending flat top central portion 33. In practice, the central portion and the outer edge portion provides the intervening annular channel or trough 32. The central portion preferably has a picture painted or lithographed thereon.

Carried in supports 35 on the cover is a shaft 36 having a small friction wheel 37 on the inner end thereof, the shaft preferably assuming a radial position with relation to the round cover. On the outer end of the shaft is a paddle wheel 38, the periphery of which dips into the trough or channel 32. The shaft may carry pulleys 39 and 40 to operate other toys.

Seated on the cone shaped end 15 of vertical shaft 9, is a tree holding cup 41, having a central recess 42 therein for the reception of the tree. At 43 are clamping bolts of the usual kind. The cup has a reduced neck portion 44 which has an internal bore shaped to receive the end of the spindle. The conical fit between the parts causes sufficient friction to make the cup to rotate with the spindle.

The tree which is supported in the cup is outlined in dotted lines and is designated A. It carries a string of lights B which are shown connected in series. The terminal wires of the lights pass down into the cup and on the bottom of the cup carries a disk 45 of insulating material on which are two conductor rings 46 and 47, one of the light wires connecting to one ring and one light wire to the other. On the hood are brushes 46' and 47' bearing against rings 46 and 47, respectively. The burshes are connected with a source of power. A switch is provided at 48 for controlling the lamps.

On the tree receiving cup is a flat surface or flange 49 which bears against friction wheel 37, so as to rotate shaft 36 and paddle wheel 38.

The spring motor may be wound by a key, not shown, removably applied to the end of shaft 8, which projects through the top of the casing.

When the spring is wound up and the tree is in place, with the lights connected, the brake may be actuated to release the motor. Thereupon, the tree will be rotated while the lights may remain lighted. With the tree rotating, the paddle wheel is rotated. Water is placed in the annular trough 32, and this water is agitated and circulated by the paddle wheel. The reflections of the lights in the water, and the reflection of ornaments on the tree, are thus constantly waved and distorted, the scintillating reflections making an extremely attractive display and lending much to the beauty of the tree. As the tree rotates, the music box, preferably set with tunes of Christmas songs, is operated.

In addition to providing a reflector, the water serves to help preserve the tree by keeping the air around the tree moist.

The whole device may be cheaply made and is a novel holder for supporting and displaying Christmas trees.

Various changes and modifications may be made in the construction and arrangement of parts within the contemplation of my invention and under the scope of the appended claim.

I claim as my invention:

In a Christmas tree holder provided with a supporting base and a rotatable support, a motor-driven shaft engaging the support, a cover for the base having an annular water channel, a paddle wheel extending into the channel, and a shaft in driving connection with the support for rotating the paddle wheel.

In testimony whereof I hereunto affix my signature.

JOHN W. GEYER.